(12) United States Patent
Park et al.

(10) Patent No.: US 12,260,606 B2
(45) Date of Patent: *Mar. 25, 2025

(54) METHOD, APPARATUS, AND PROGRAM FOR DETECTING MARK BY USING IMAGE MATCHING

(71) Applicant: NAVER WEBTOON LTD., Seongnam-si (KR)

(72) Inventors: Sang Min Park, Seongnam-si (KR); Choong Hyun Seo, Seongnam-si (KR); Jin Seo Lee, Seongnam-si (KR); Seung Ik Kim, Seongnam-si (KR); Yo Seob Lee, Seongnam-si (KR)

(73) Assignee: NAVER WEBTOON LTD., Seongnam-si (KR)

( * ) Notice: Subject to any disclaimer, the term of this patent is extended or adjusted under 35 U.S.C. 154(b) by 927 days.

This patent is subject to a terminal disclaimer.

(21) Appl. No.: 17/168,526

(22) Filed: Feb. 5, 2021

(65) Prior Publication Data

US 2021/0158573 A1 May 27, 2021

Related U.S. Application Data

(63) Continuation of application No. PCT/KR2019/007958, filed on Jul. 1, 2019.

(30) Foreign Application Priority Data

Aug. 6, 2018 (KR) .......................... 10-2018-0091447

(51) Int. Cl.
*G06T 17/00* (2006.01)
*G06T 3/40* (2006.01)
(Continued)

(52) U.S. Cl.
CPC .............. *G06V 10/273* (2022.01); *G06T 3/40* (2013.01); *G06T 7/90* (2017.01); *G06T 7/97* (2017.01);
(Continued)

(58) Field of Classification Search
CPC .. G06V 10/273; G06V 10/267; G06V 10/443; G06V 10/754; G06T 3/40;
(Continued)

(56) References Cited

U.S. PATENT DOCUMENTS 8,558,849 B2 10/2013 Choi
8,655,321 B2 2/2014 Baer et al.
(Continued)

FOREIGN PATENT DOCUMENTS

JP 2001067481 A 3/2001
JP 2004271958 A 9/2004
(Continued)

OTHER PUBLICATIONS

Office action issued in corresponding Korean application KR 10-2018-0091447, dated Aug. 12, 2019.
(Continued)

*Primary Examiner* — Siamak Harandi
*Assistant Examiner* — Mehrazul Islam
(74) *Attorney, Agent, or Firm* — Greer Burns & Crain Ltd.

(57) ABSTRACT

An apparatus for detecting a mark by using image matching includes a damaged content obtaining unit configured to obtain damaged content generated based on original content including a plurality of cuts; a pre-processed content generating unit configured to generate pre-processed content by merging one or more images included in the damaged content or removing a partial region of one or more cuts included in the damaged content; a matchable content gen-
(Continued)

erating unit configured to generate matchable content, in which sizes or locations of one or more cuts included in the pre-processed content are adjusted by comparing one or more cuts included in the original image and the one or more cuts included in the pre-processed content; a matching unit configured to compare the original content with the matchable content, for each cut.

14 Claims, 12 Drawing Sheets

(51) Int. Cl.
*G06T 5/50* (2006.01)
*G06T 7/00* (2017.01)
*G06T 7/90* (2017.01)
*G06V 10/26* (2022.01)
*G06V 10/44* (2022.01)
*G06V 10/75* (2022.01)

(52) U.S. Cl.
CPC .......... *G06V 10/267* (2022.01); *G06V 10/443* (2022.01); *G06V 10/754* (2022.01)

(58) Field of Classification Search
CPC ... G06T 7/90; G06T 7/97; G06F 16/00; G06F 16/583; G06F 16/5854; G06F 16/5838
See application file for complete search history.

(56) References Cited

U.S. PATENT DOCUMENTS

| | | | |
|---|---|---|---|
| 9,569,831 B2 | 2/2017 | Song et al. | |
| 9,811,943 B2 | 11/2017 | Ogura | |
| 10,389,720 B2 | 8/2019 | Lee et al. | |
| 2004/0230614 A1 | 11/2004 | Hirai | |
| 2009/0125607 A1* | 5/2009 | Rhoads | H04N 21/8358 707/E17.014 |
| 2013/0083078 A1* | 4/2013 | Dai | H04N 7/0122 345/660 |
| 2013/0194301 A1* | 8/2013 | Robbins | H04L 51/02 345/629 |
| 2014/0301648 A1* | 10/2014 | Kato | G06F 18/28 382/199 |
| 2015/0177966 A1* | 6/2015 | Ragusa | H04N 1/00198 345/648 |
| 2017/0098122 A1 | 4/2017 | el Kaliouby et al. | |
| 2017/0329942 A1* | 11/2017 | Choi | H04L 9/088 |
| 2018/0173981 A1* | 6/2018 | Rosqvist | G06V 40/50 |

FOREIGN PATENT DOCUMENTS

| | | |
|---|---|---|
| JP | 2006234554 A | 9/2006 |
| JP | 2008258938 A | 10/2008 |
| JP | 2011008579 A | 1/2011 |
| JP | 2011114455 A | 6/2011 |
| JP | 2016063325 A | 4/2016 |
| JP | 2017138715 A | 8/2017 |
| KR | 1020110020147 A | 3/2011 |
| KR | 1020110068795 A | 6/2011 |
| KR | 1020110123393 A | 11/2011 |
| KR | 1020130052334 A | 5/2013 |
| KR | 1020140015460 A | 2/2014 |
| KR | 1020140073834 A | 6/2014 |
| KR | 1020150020390 A | 2/2015 |
| KR | 101676575 B1 | 11/2016 |
| KR | 101744614 B1 | 6/2017 |
| KR | 1020170076368 A | 7/2017 |
| KR | 101841192 B1 | 3/2018 |
| WO | 2015141214 A1 | 9/2015 |
| WO | 2017111340 A1 | 6/2017 |

OTHER PUBLICATIONS

Notice of allowance issued in corresponding Korean application No. KR 10-2018-0091447, dated Feb. 20, 2020.
ISR issued in Int'l. Application No. PCT/KR2019/007958, dated Oct. 2, 2019.
Office Action issued in corresponding Japanese patent application No. 2021-506306, dated Mar. 29, 2022.
Office action issued in corresponding Chinese Patent Application No. 201980051523.X, dated Jan. 24, 2025.

* cited by examiner

FIG. 9A
FIG. 9B
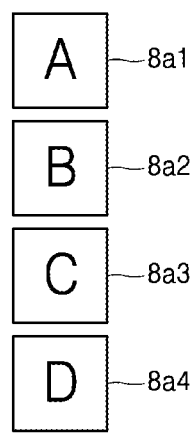
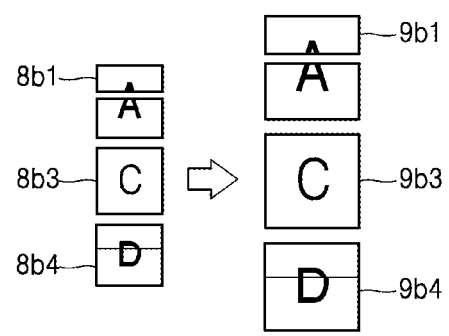

FIG. 10A
FIG. 10B
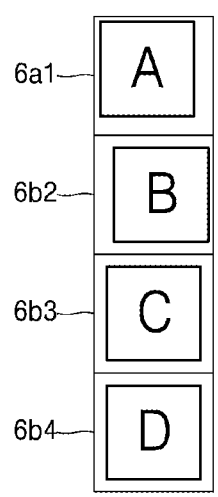
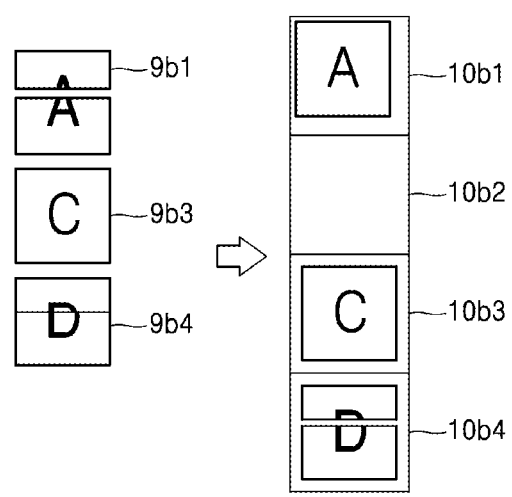

METHOD, APPARATUS, AND PROGRAM FOR DETECTING MARK BY USING IMAGE MATCHING

CROSS-REFERENCE TO RELATED APPLICATIONS

This is a continuation application of International Application No. PCT/KR2019/007958, filed Jul. 1, 2019, which claims the benefit of Korean Patent Application No. 10-2018-0091447, filed Aug. 6, 2018.

BACKGROUND OF THE INVENTION

Field of Invention

The present disclosure relates to a method, an apparatus, and a program for detecting a mark by using image matching, and more particularly, to a method, apparatus, and program for detecting a mark by using image matching, wherein a mark added to leaked content is easily detected by comparing original content and content damaged during leakage for each cut and adjusting sizes and locations of cuts included in the leaked content.

Description of Related Art

With the rapid development of online content markets, content leak and unauthorized or illegal duplication markets resulting from easiness of duplication of digital data are also increasing day by day. A method of adding a watermark to content, or the like is being used to prevent unauthorized duplication of the content, but the watermark decreases visibility of the content, deleting of the watermark does not require a difficult technique, and it is difficult to detect a leaker by using the watermarked content.

In general, cartoons refer to drawings that concisely and humorously draw or exaggeratedly show the appearances of people, animals, objects, etc., and provide reading materials with humor, satire, or certain storylines by inserting short texts. Recently, online cartoons have been released and many users are getting pleasure and information through reading cartoons. For example, KR 10-2011-0123393 (published on Nov. 15, 2011) discloses a technology for providing a cartoon in a form of mobile digital content through a direct online transaction.

BRIEF SUMMARY OF THE INVENTION

An object of the present disclosure is to generate matchable content in which sizes and locations of cuts included in leaked content are adjusted by comparing original content and content damaged during leakage are compared for each cut.

Another object of the present disclosure is to detect a mark from leaked content by comparing original content with matchable content.

According to an embodiment of the present disclosure, an apparatus for detecting a mark by using image matching, includes: a damaged content obtaining unit configured to obtain damaged content generated based on original content including a plurality of cuts; a pre-processed content generating unit configured to generate pre-processed content by merging one or more images included in the damaged content or removing a partial region of one or more cuts included in the damaged content; a matchable content generating unit configured to generate content for matching, in which sizes or locations of one or more cuts included in the pre-processed content are adjusted by comparing one or more cuts included in the original image and the one or more cuts included in the pre-processed content; a matching unit configured to match the original content with the matchable content, for each cut.

The apparatus may further include a mark detecting unit configured to detect a mark present in a specific cut of the matchable content, which is not present in a specific cut of the original content but is matched to the specific cut of the original content.

The matching unit may be configured to display a portion where the original content and the matchable content are the same in a first color and display a portion where the original content and the matchable content are different in a second color.

The matchable content generating unit may be further configured to: determine a cut location of each of the one or more cuts included in the pre-processed content by comparing the one or more cuts included in the original image and the one or more cuts included in the pre-processed image; generate one or more empty images of a same size as the one or more images of the original content; and arrange the one or more cuts included in the pre-processed image on the one or more empty images, based on the determined cut location.

The matchable content generating unit may be further configured to calculate a scale ratio for each cut by comparing cuts of the original content and cuts of the damaged content, and then adjust the sizes of the one or more cuts of the damaged content based on the calculated scale ratio.

The pre-processed content generating unit may be further configured to generate a merged image by merging individual images included in the damaged content, and generate the pre-processed image including only cuts obtained by removing outer regions of cuts of the merged image.

The matchable content generating unit may be further configured to calculate a scale ratio based on a horizontal length of a cut for vertical content and calculate the scale ratio based on a vertical length of the cut for horizontal content.

The matchable content generating unit may be further configured to adjust sizes of other cuts of the damaged content, based on a calculated scale ratio of a specific cut of the damaged content.

The mark detecting unit may be further configured to enlarge and display a region where the mark is addable, in content where the original content and the matchable content are matched.

According to an embodiment of the present disclosure, a method of detecting a mark by using image matching, includes: obtaining damaged content generated based on original content including a plurality of cuts; generating pre-processed content by merging one or more images included in the damaged content or removing a partial region of one or more cuts included in the damaged content; generating matchable content, in which sizes or locations of one or more cuts included in the pre-processed content are adjusted by comparing one or more cuts included in the original image and the one or more cuts included in the pre-processed content; matching the original content and the matchable content, for each cut.

The method may further include detecting a mark present in a specific cut of the matchable content, which is not present in a specific cut of the original content but is matched to the specific cut of the original content.

The generating of the matchable content may include: determining a cut location of each of the one or more cuts included in the pre-processed content by comparing the one or more cuts included in the original image and the one or more cuts included in the pre-processed image; generating one or more empty images of a same size as the one or more images of the original content; and arranging the one or more cuts included in the pre-processed image on the one or more empty images, based on the determined cut location.

The generating of the pre-processed content may include: generating a merged image by merging individual images included in the damaged content; and generating the pre-processed content including only cuts obtained by removing outer regions of cuts of the merged image.

The generating of the matchable content may include calculating a scale ratio for each cut by comparing cuts of the original content and cuts of the damaged content, and then adjusting the sizes of the one or more cuts of the damaged content based on the calculated scale ratio.

Also, provided is a computer program recorded on a computer-readable recording medium to execute the method of detecting a mark by using image matching according to the present disclosure.

According to the present disclosure, because a mark indicating viewer information is added to leaked content, a content leaker may be easily detected by using the added mark.

According to the present disclosure, by generating matchable content in which sizes and locations of cuts included in leaked content are adjusted, a matching result of high accuracy may be provided even when the content is damaged during leakage.

According to the present disclosure, a mark is detected by matching matchable content with original content, and thus leaker information may be obtained by using the detected mark.

BRIEF DESCRIPTION OF THE DRAWINGS

FIG. 9A and FIG. 9B are example diagrams illustrating adjusting of sizes of cuts, according to an embodiment of the present disclosure.

FIG. 10A and FIG. 10B are example diagrams illustrating adjusting of a location of a cut, according to an embodiment of the present disclosure.

DETAILED DESCRIPTION OF THE INVENTION

Figure 1:
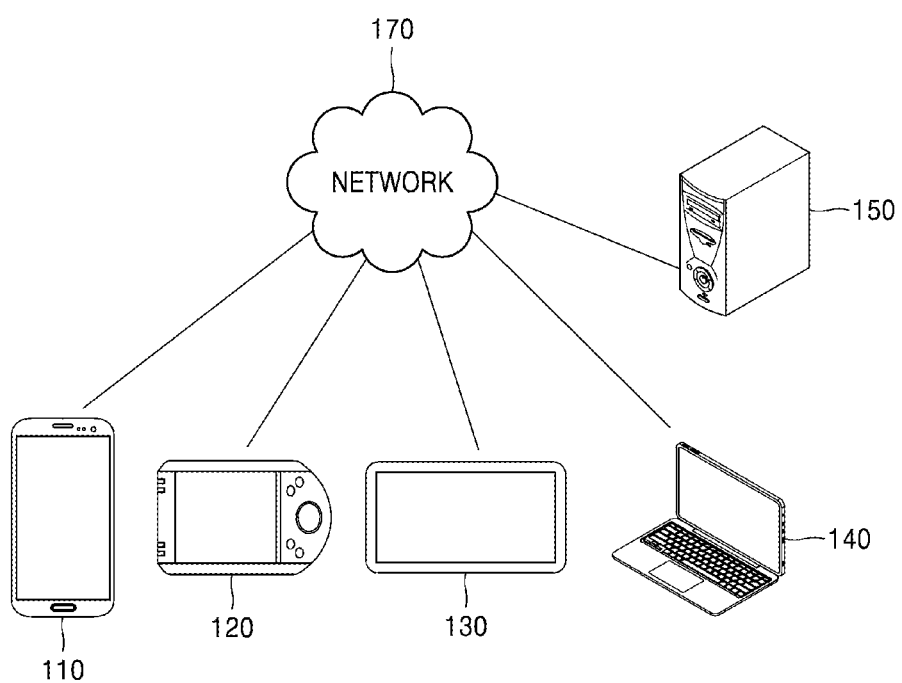
FIG. 1 is a diagram showing an example of a network environment according to an embodiment of the present disclosure.

The detailed description of the present disclosure to be described below refers to the accompanying drawings, which illustrate specific embodiments in which the present disclosure may be practiced. These embodiments are described in sufficient detail to enable one of ordinary skill in the art to practice the present disclosure. It is to be understood that various embodiments of the present disclosure are different from each other, but need not be mutually exclusive. For example, specific shapes, structures, and characteristics described herein may be changed from one embodiment to another embodiment and implemented without departing from the spirit and scope of the present disclosure. In addition, it should be understood that positions or arrangements of individual elements in each embodiment may be changed without departing from the spirit and scope of the present disclosure. Accordingly, the detailed description described below is not implemented in a limiting sense, and the scope of the present disclosure may encompass the scope claimed by claims and all scopes equivalent thereto. In drawings, the like reference numerals denote the same or similar elements over various aspects.

FIG. 1 is a diagram showing an example of a network environment according to an embodiment of the present disclosure.

The network environment of FIG. 1 includes a plurality of user terminals 110, 120, 130, 140, a server 150, and a network 170. FIG. 1 is an example for describing the present disclosure and the number of user terminals or the number of servers is not limited to that shown in FIG. 1.

The plurality of user terminals 110, 120, 130, 140 may be fixed terminals or mobile terminals implemented as computing devices. The plurality of user terminals 110, 120, 130, 140 may be, for example, smart phones, mobile phones, navigation devices, computers, laptop computers, digital broadcasting terminals, personal digital assistants (PDAs), portable multimedia players (PMPs), and table personal computers (PCs). For example, a first user terminal 110 may communicate with the other user terminals 120, 130, 140 and/or the server 150 via the network 170 by using a wireless or wired communication method.

A communication method is not limited and may include not only a communication method using a communication network (for example, a mobile communication network, wired Internet, wireless Internet, or a broadcasting network) that may be included in the network 170, but also short distance wireless communication between devices. For example, the network 170 may include one or more arbitrary network from among networks such as a personal area network (PAN), a local area network (LAN), a campus area network (CAN), a metropolitan area network (MAN), a wide area network (WAN), a broadband network (BBN), and the Internet. Also, the network 170 may include one or more of network topologies including a bus network, a start network, a ring network, a mesh network, a star-bus network, and a tree or hierarchical network, but is not limited thereto.

The server 150 may be implemented as a computing device or a plurality of computing devices providing an instruction, a code, a file, content, a service, or the like by communicating with the plurality of user terminals 110, 120, 130, 140 via the network 170.

For example, the server 150 may provide a file for installation of an application to the first user terminal 110 accessed via the network 170. In this case, the first user terminal 110 may install the application by using the file provided by the server 150. Also, the first user terminal 110 may access the server 150 and receive a service or content provided by the server 150 according to control of an operating system (OS) or at least one program (for example, a browser or installed application) included in the first user terminal 110. For example, when the first user terminal 110 transmits a mark detection request to the server 150 via the network 170 under the control of the application, the server 150 may generate matchable content by comparing leaked content with original content and transmit, to the first user terminal 110, the result of comparing the matchable content and the original content and detected mark information, and the first user terminal 110 may display the result of matching and the detected mark information under the control of the application. As another example, the server 150 may set a communication session for data exchange and route the data exchange between the plurality of user terminals 110 through 140 through the set communication session.

Figure 2:
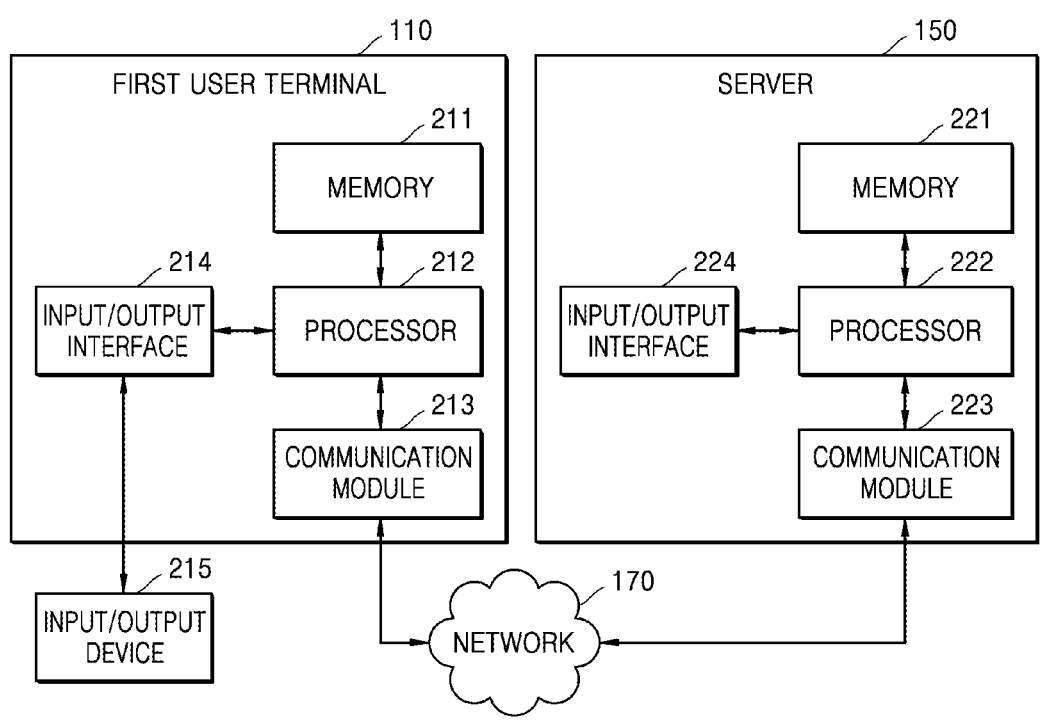
FIG. 2 is a block diagram of internal configurations of a user terminal and a server, according to an embodiment of the present disclosure.

FIG. 2 is a block diagram of internal configurations of a user terminal and a server, according to an embodiment of the present disclosure.

In FIG. 2, an internal configuration of the first user terminal 110 will be described as an example of one user terminal and an internal configuration of the server 150 will be described as an example of one server. The other user terminals 120, 130, 140 may have the same or similar internal configurations.

The first user terminal 110 and the server 150 may include memories 211 and 221, processors 212 and 222, communication modules 213 and 223, and input/output interfaces 214 and 224. The memories 211 and 221 are computer-readable recording media, and may include random access memory (RAM), read-only memory (ROM), and a permanent mass storage device such as a disk drive. Also, the memories 211 and 221 may store an OS and at least one program code (for example, a browser installed and driven in the first user terminal 110 or a code for the application described above). Such software components may be loaded from a computer-readable recording medium separate from the memories 211 and 221, by using a drive mechanism. Such a separate computer-readable recording medium may include a computer-readable recording medium such as a floppy drive, a disk, a tape, a DVD/CD-ROM drive, or a memory card. According to another embodiment, the software components may be loaded on the memories 211 and 221 through the communication modules 213 and 223, instead of the computer-readable recording medium. For example, at least one program may be loaded on the memories 211 and 221 based on a program (for example, the above-described application) installed by files provided by developers or a file distribution system (for example, the server 150) distributing an application installation file, through the network 170.

The processors 212 and 222 may be configured to process an instruction of a computer program by performing basic arithmetic, logic, and input/output operations. The instruction may be provided to the processors 212 and 222 by the memories 211 and 221 or the communication modules 213 and 223. For example, the processors 212 and 222 may be configured to execute a received instruction according to a program code stored in recording devices, such as the memories 211 and 221.

The communication modules 213 and 223 may provide a function enabling the first user terminal 110 and the server 150 to communicate with each other through the network 170, and may provide a function for communicating with another user terminal (for example, a second user terminal 120) or another server (for example, the server 150). For example, a request generated by the processor 212 of the first user terminal 110 according to a program code stored in a recording medium, such as the memory 211 may be transmitted to the server 150 through the network 170, according to a control of the communication module 213. On the other hand, a control signal, an instruction, content, or a file provided according to a control of the processor 222 of the server 150 may be transmitted to the first user terminal 110 through the communication module 213 of the first user terminal 110 via the communication module 223 and the network 170. For example, the control signal, the instruction, or the like of the server 150 received through the communication module 213 may be transmitted to the processor 212 or the memory 211, and the content, the file, or the like may be stored in a storage medium that may be further included by the first user terminal 110.

The input/output interfaces 214 and 224 may be a unit for interfacing with an input/output device 215 (not shown with respect to the server 150). For example, an input device of the input/output device 215 may include a device such as a keyboard or a mouse, and an output device of the input/output device 215 may include a device such as a display for displaying a communication session of an application. As another example, the input/output interface 214 may be a unit for interfacing with a device in which functions for input and output are integrated, such as a touch screen. In detail, with respect to the processor 212 of the first user terminal 110 processing an instruction of a computer program loaded on the memory 211, a service screen or content configured by using data provided by the server 150 or second user terminal 120 may be displayed on a display via the input/output interface 214.

Also, according to other embodiments, the first user terminal 110 and the server 150 may include more components than those shown in FIG. 2. For example, the first user terminal 110 may be implemented to include at least some of the input/output device 215 described above or may further include other components, such as a transceiver, a global positioning system (GPS) module, a camera, various sensors, and a database.

Figure 3:
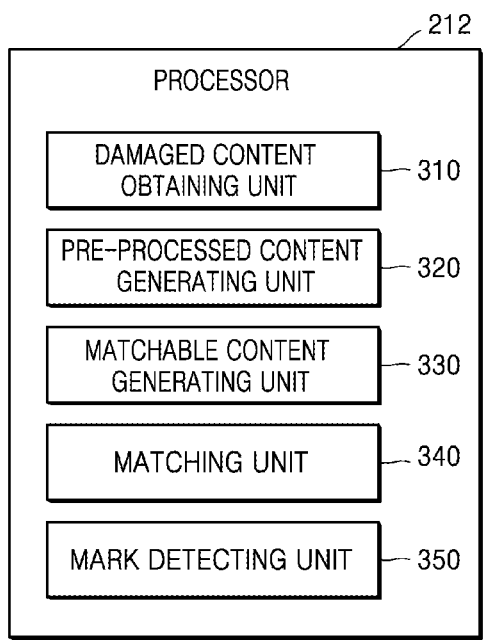
FIG. 3 illustrates an internal configuration of a processor, according to an embodiment of the present disclosure.

FIG. 3 illustrates the internal configuration of the processor 212, according to an embodiment of the present disclosure.

The processor 212 may include a web browser or application capable of receiving a webpage online and outputting the webpage. A configuration for performing a mark detecting function using image matching, according to an embodiment of the present disclosure, in the processor 212 may include, as shown in FIG. 3, a damaged content obtaining unit 310, a pre-processed content generating unit 320, a matchable content generating unit 330, a matching unit 340, and a mark detecting unit 350. According to an embodiment, the components of the processor 212 may be selectively included in or excluded from the processor 212. Also, according to an embodiment, the components of the processor 212 may be separated or combined for representation of functions of the processor 212.

Here, the components of the processor 212 may be representation of different functions of the processor 212, which are performed by the processor 212 according to an instruction (for example, an instruction provided by the web browser driven in the first user terminal 110) provided by a program code stored in the first user terminal 110.

Figure 4:
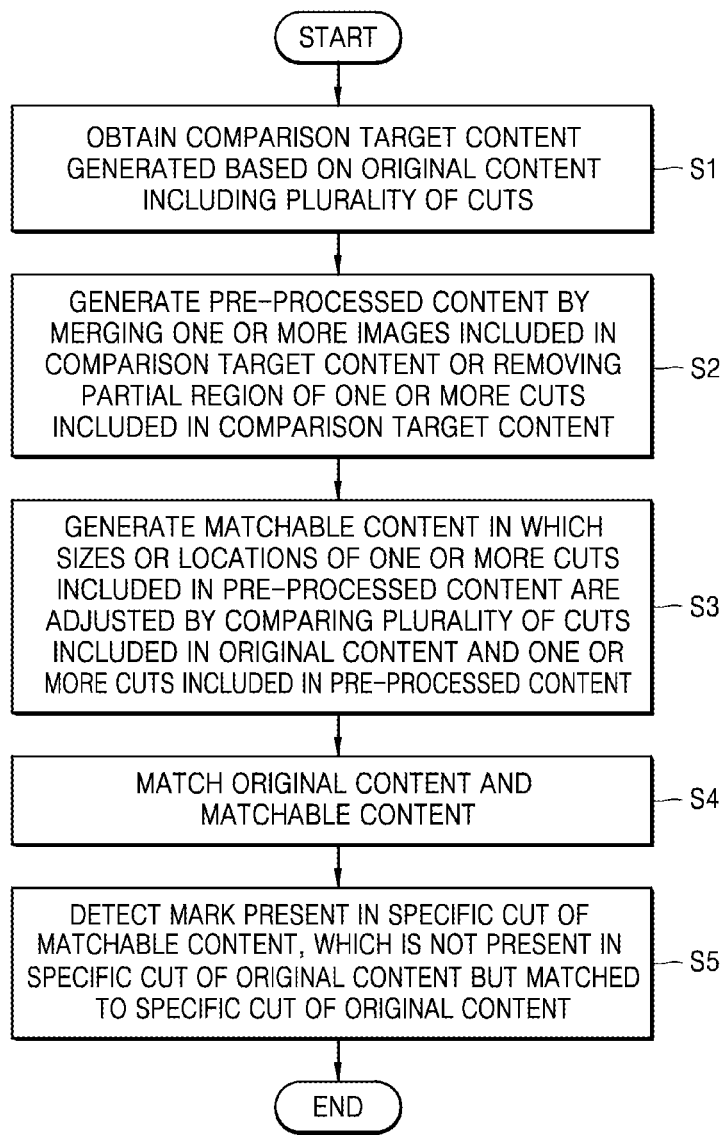
FIG. 4 is a flowchart showing, in time-series, a method of detecting a mark by using image matching, according to an embodiment of the present disclosure.

The processor 212 and the components of the processor 212 may control the first user terminal 110 to perform operations S1 through S6 included in a method of detecting a mark by using image matching of FIG. 4. For example, the processor 212 and the components of the processor 212 may be implemented to execute instructions according to a code of the OS or a code of the at least one program included in the memory 211.

FIG. 4 is a flowchart showing, in time-series, a method of detecting a mark by using image matching, according to an embodiment of the present disclosure. Hereinafter, a method, a system, and a program for detecting a mark by using image matching, according to the present disclosure, will be described in detail with reference to FIGS. 3 and 4 together.

First, the damaged content obtaining unit 310 obtains comparison target content generated based on original content having a plurality of cuts (operation S1).

Content leaked by content leakers may be the damaged content compared to the original content due to various reasons. Leaked content is a disclosure of confidential, personal or other sensitive content in an unsecured environment. Content may be leaked unintentionally or by intentional attacks by content leakers. Leaked content may be damaged in various ways, for example, the content may be enlarged or reduced, the content may be cut off, an arrangement between cuts may be different from original content, and some of the content may be lost or overlapped. Here, information about a leaker is obtainable only when information about where a mark is added to viewed content is present, but when the leaked content is damaged, it may be difficult to determine information about the correct mark location even when the leaked content and the original content are matched. In this regard, the present disclosure is characterized in generating matchable content by adjusting a size or location of the leaked content to match the leaked content with the original content, and detecting the mark by comparing the matchable content with the original content.

Figure 5:
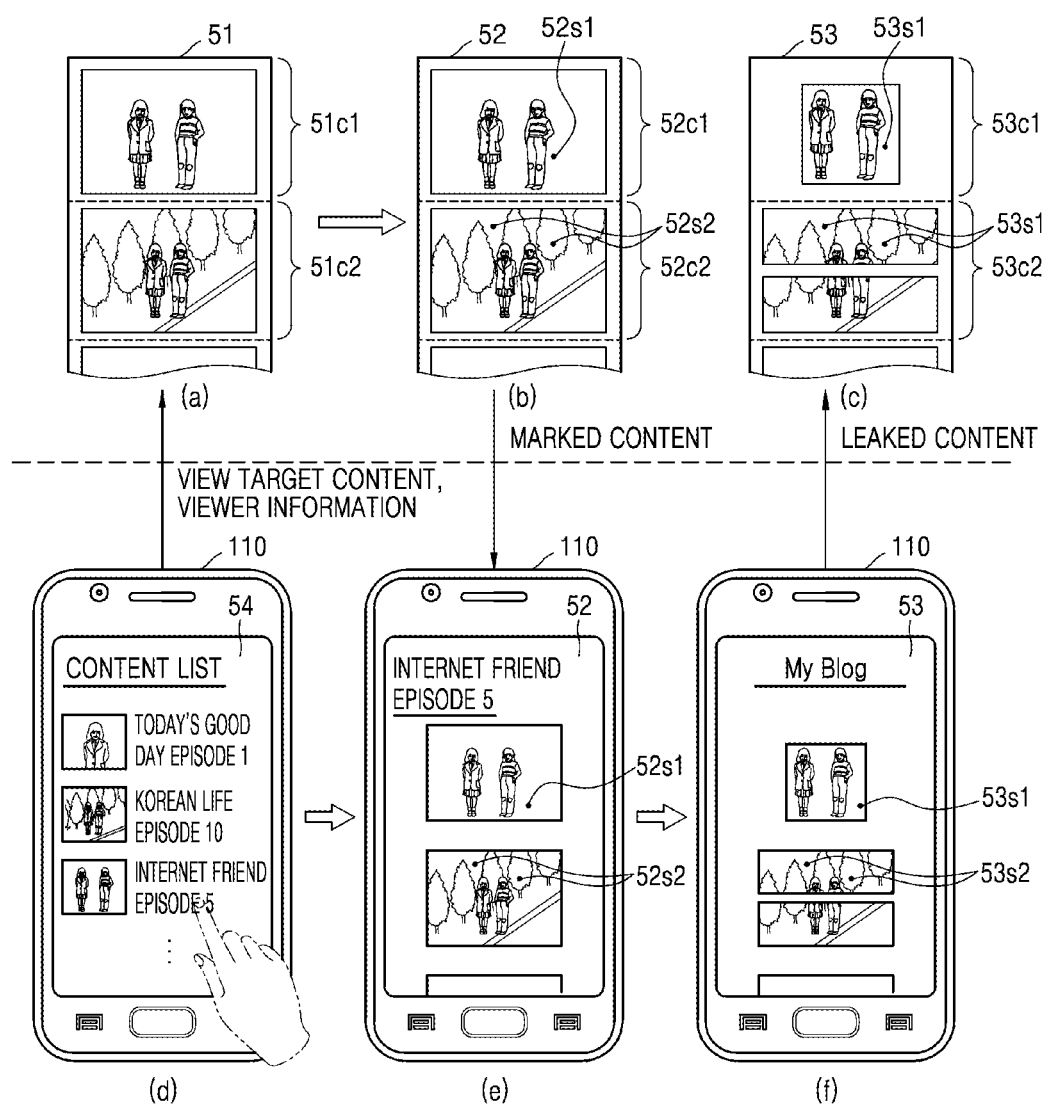
FIG. 5 are example diagrams illustrating a process in which damaged leaked content is generated, according to an embodiment of the disclosure.

FIG. 5 illustrates an example for describing a process in which damaged leaked content is generated, according to an embodiment of the disclosure.

In the example of FIG. 5, (a) illustrates original content, (b) illustrates marked content obtained by adding a mark to the original content, and (c) illustrates leaked content leaked by a user. Also, (d) through (e) illustrate examples of displays of a screen of the first user terminal 110.

First, referring to (d) of FIG. 5, the user may select view target content 51 desired to be viewed from a content list 54. As described above, the view target content 51 of the present disclosure may be content including cuts $51c1$ and $51c2$, and each piece of content may be an episode of series content. For example, in the content list 54 of FIG. 5, "Internet Friend Episode 5" may be content of a 5th episode of series content including episodes 1 to 5. The user may select "Internet Friend Episode 5" as the view target content 51 among displayed pieces of content, and information about the selected view target content 51 and viewer information may be received.

Then, the processors 212 and 222 may generate marked content 52 from the view target content 51. Marks $52s1$ and $52s2$ may be added respectively to cuts $52c1$ and $52c2$ of the marked content 52. In other words, when a content viewer who does not have the right to distribute content leaks the content without permission, the marked content 52 to which a mark based on leaker information is added may be provided to the first user terminal 110 instead of original content so as to detect a leaker. Also, the leaker information may be obtained by detecting the marker in the leaked content.

In detail, as shown in (e) of FIG. 5, the marked content 52 may be displayed on the first user terminal 110, and the marked content 52 of (b) may be the original content of (a) to which the marks $52s1$ and $52s2$ for leaker detection are added. Meanwhile, when the user downloads or captures the marked content 52 displayed on the first user terminal 110 and leaks the marked content 52 in another place, such as his/her SNS account, the leaked content may be damaged. In other words, as shown in (f) of FIG. 5, content 53 leaked by the user on his/her SNS account (My Blog) may be content where the marked content 52 is damaged. This is because some content may be lost, a size may be changed, or an arrangement may be changed while downloading and capturing the marked content 52 and uploading the marked content 52 again. In other words, the leaked content 53 as shown in (c) of FIG. 5 may have an outer portion of a first cut $53c1$ being cropped or a center portion of a second cut $52c2$ being lost compared to the original marked content 52.

According to an embodiment of the present disclosure, original content and marked content are matched to detect a location of a mark, and information about a leaker is obtained from the location of the mark. However, when the leaked content is damaged as shown in (c) of FIG. 5, it may be difficult to detect an accurate location of the mark via matching with the original content. In this regard, in the present disclosure, content for matching or matchable content is generated by adjusting the size and location of the leaked content such that the mark is detectable via matching with the original content, and the location of the mark may be detected by matching the matchable content and the original content.

Figure 6A:
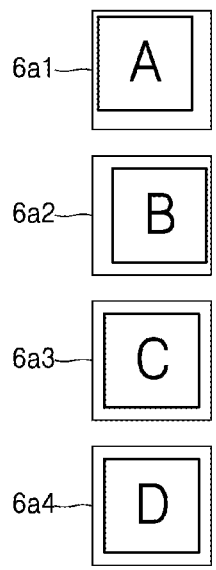
FIG. 6A and FIG. 6B are example diagrams illustrating original content and damaged content.
Figure 6B:
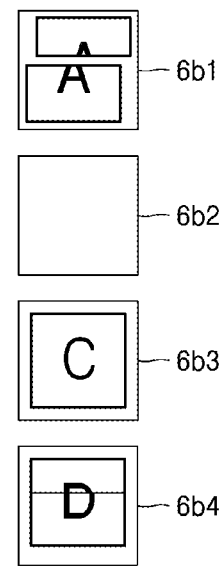

FIG. 6A and FIG. 6B illustrate an example of original content and damaged content.

FIG. 6A may be the original content and FIG. 6B may be the leaked damaged content. In detail, the original content includes four images $6a1$ through $6a4$ and each image may include one cut. Here, a cut may include a cut line and cut content inside the cut line. Also, the leaked damaged content may include four images $6b1$ through $6b4$, but only three images $6b1$, $6b3$, and $6b4$ may each include one cut in the leaked damaged content. In other words, a second cut (the cut of the image $6a2$) may be lost in the damaged content and the damaged content may substantially include three cuts. In detail, a cut of a first image $6b1$ of the leaked damaged content may be a cut of a first image $6a1$ of the original content, in which a middle thereof is split into two portions and the split portions are misaligned. Also, a third image $6b3$ of the leaked damaged content may be an intact third image $6a3$ of the original content. Also, a cut of a fourth image $6b4$ of the leaked damaged content may be a cut of a fourth image $6a4$ of the original content, in which a middle thereof is partially overlapped and thus is lost. In other words, cuts of the damaged content may be modified cuts of the original content, and hereinafter, a method of generating matchable content by adjusting the damaged content will be described.

First, the pre-processed content generating unit 320 may generate pre-processed content by merging one or more images included in the damaged content or removing a partial region of one or more cuts included in the damaged content (operation S2). In detail, the pre-processed content generating unit 320 may generate a merged image by merging individual images included in the damaged content, and generate the pre-processed image including only cuts obtained by removing outer regions of cuts of the merged image. According to an embodiment of the disclosure, the pre-processed content generating unit 320 may allow matching with the original image to be performed faster by performing pre-processing of merging images, removing an empty space outside a cut, or the like.

In detail, the pre-processed content generating unit 320 may sequentially connect images horizontally or vertically so as to merge the one or more images included in the damaged content. When content proceeds vertically, images may be connected vertically, and when the content proceeds horizontally, the images may be connected horizontally. Here, the pre-processed content generating unit 320 may also connect a plurality of images included in the original content horizontally or vertically.

Figure 7A:
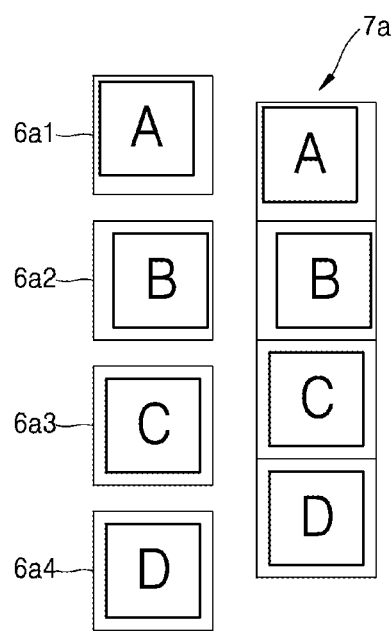
FIG. 7A and FIG. 7B are example diagrams illustrating merging of images of content, according to an embodiment of the present disclosure.
Figure 7B:
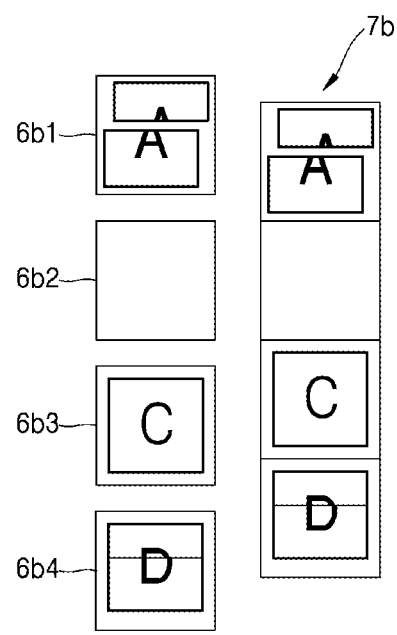

FIG. 7A and FIG. 7B illustrate an example of merging images of content, according to an embodiment of the present disclosure.

Referring to FIG. 7B, merged content 7b obtained by vertically connecting the first through fourth images 6b1 through 6b4 of the damaged content of FIG. 6B is illustrated. As shown in FIG. 7B, there is no space between images in the merged content 7b. Here, a space between images generally denotes an outer region of images. Also, the pre-processed content generating unit 320 may generate merged content 7a by vertically connecting images belonging to the first through fourth images 6a1 through 6a4 of the original content.

Also, the pre-processed content generating unit 320 may generate the pre-processed content including only the cuts obtained by removing outer regions of the one or more cuts included in the damaged content. In detail, the pre-processed content generating unit 320 may remove a region outside a cut line of each image belonging to the damaged content. When there is no cut belonging to the damaged content, the pre-processed content generating unit 320 may remove a corresponding image itself. In addition, the pre-processed content generating unit 320 may remove an outer region of the plurality of cuts included in the original content.

According to an embodiment of the present disclosure, an empty space may be removed to generate the matchable content because the outer region of the cut line is highly likely to be an empty space not including content, based on characteristics of content including cuts. Here, an outer region of a cut generally denotes an outer region of a cut line. The cut line may be a section partitioned by a creator of the content to show each scene in content including cuts, such as a cartoon.

Figure 8A:
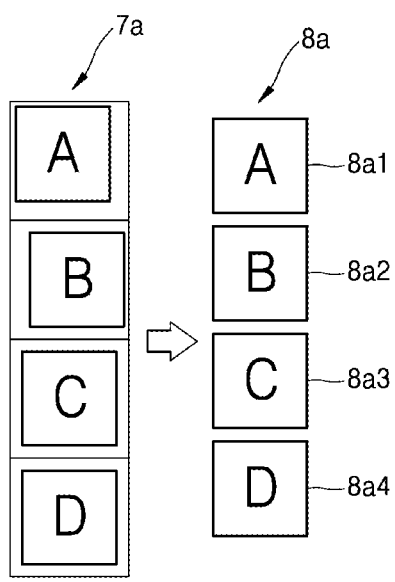
FIG. 8A and FIG. 8B are example diagrams illustrating removing of an outer region of a cut, according to an embodiment of the present disclosure.
Figure 8B:
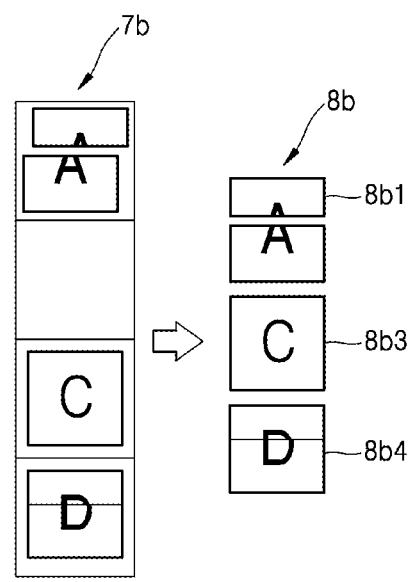

FIG. 8A and FIG. 8B illustrates an example of removing an outer region of a cut, according to an embodiment of the present disclosure.

Referring to FIG. 8A and FIG. 8B, pieces of pre-processed content 8a and 8b may be generated by removing outer regions of cuts of the pieces of merged content 7a and 7b generated in the embodiment as in FIG. 7A and FIG. 7B. In detail, the pre-processed content 8b including cuts 8b1, 8b3, and 8b4 may be generated by removing the outer regions of the cuts, i.e., outer regions of cut lines, of the merged content 7b of the damaged content. Here, when a cut is divided in several pieces and the pieces do not align like the first cut of the merged content 7b, the pieces may be aligned like a first cut 8b1 while generating the pre-processed content 8b. Similarly, the pre-processed content 8a including cuts 8a1 through 8b4 may be generated by removing the outer regions of the cuts of the merged content 7a of the original content.

Next, the matchable content generating unit 330 generates the matchable content in which sizes or locations of the one or more cuts included in the pre-processed content are adjusted by comparing the one or more cuts included in the original content and the one or more cuts included in the pre-processed content (operation S3). In detail, the matchable content generating unit 330 may calculate a scale ratio by comparing the cuts of the original content and the cuts of the damaged content and then adjust the sizes of the cuts of the damaged content based on the calculated scale ratio.

According to an embodiment of the present disclosure, because the pre-processed content including only pure cuts from which the outer regions of the cuts are removed during pre-processing is generated, the sizes of cuts of the damaged content may be matched to the sizes of cuts of the original content by comparing the sizes of cuts included in the pre-processed content. For example, the scale ratio may be calculated by comparing the size of the first cut of the pre-processed content of the original content and the size of the first cut of the pre-processed content of the damaged content, and the size of the first cut of the damaged content may be adjusted based on the scale ratio.

According to a selective embodiment, the matchable content generating unit 330 may calculate the scale ratio based on a horizontal or vertical length of a cut, depending on the type of content. In detail, the matchable content generating unit 330 may calculate the scale ratio based on a horizontal length of a cut when the original content is vertical content and calculate the scale ratio based on a vertical length of the cut when the original content is horizontal content. This is because it is highly likely that content may be lost or overlapped in a horizontal direction for the vertical content (the cut of the first image 6b1 or the second image 6b2 in FIG. 6B), and it is highly likely that content may be lost or overlapped in a vertical direction for the horizontal content.

According to a selective embodiment, the matchable content generating unit 330 may adjust the sizes of other cuts of the damaged content based on a calculated scale ratio of a specific cut. For example, the matchable content generating unit 330 may adjust the sizes of other cuts of the damaged content based on the calculated scale ratio of a cut having a lowest degree of modification compared to the original contents. This saves the trouble of calculating the scale ratios of all cuts by determining the scale ratios of other cuts based on the scale ratio of one cut, because it is highly likely that the scale ratios of the cuts in the damaged content has little or no difference between the cuts.

FIG. 9A and FIG. 9B illustrate an example of adjusting sizes of cuts, according to an embodiment of the present disclosure.

Referring to FIG. 9A and FIG. 9B, the cuts 8a1 through 8b4 of the original content and the cuts 8b1, 8b3, and 8b4 of the damaged content are illustrated as shown in FIG. 8A and FIG. 8B described above. According to an embodiment of the present disclosure, the scale ratio of the cut of the original content and the cut of the damaged content may be calculated for each cut. Here, vertical content proceeding vertically is shown in FIG. 9A and FIG. 9B, and thus the scale ratio may be calculated based on a horizontal length of the cut. For example, the scale ratio of the first cuts 8a1 and 8b1 of the original content and damaged content may be 1:0.5. In other words, when leaking the damaged content, a leaker may have reduced the size of the first cut 8a1 by half. In this case, the size of the first cut 8b1 of the damaged content may be enlarged twice to generate a first cut 9b1 having an adjusted size to match the size of the first cut 8a1 of leaked content.

According to an embodiment of the present disclosure, in the embodiment of FIG. 9A and FIG. 9B, the sizes of the other cuts of the damaged content may be adjusted based on a scale ratio of a third cut 8b3 of the damaged content, which has a least amount of damage. For example, when a scale ratio of third cuts 8a3 and 8b3 of the original content and damaged content is 1:0.25, the sizes of cuts 8b1, 8b3, and 8b4 of the damaged content may be enlarged four times to generate cuts 9b1, 9b3, and 9b4 having adjusted sizes.

Also, the matchable content generating unit 330 may determine the location where a cut is arranged on an image for each cut of the damaged content by comparing the cuts of the original content and the cuts of the pre-processed content. Here, the cuts of the pre-processed content may be cuts having adjusted sizes as described above. It may be determined where in the image the cuts of the pre-processed content having the adjusted sizes are located while being compared with the cuts of the original content. As described above with reference to FIG. 6A and FIG. 6B, the original content of the present disclosure may include one or more images including a cut, and a location of a cut on an image is also one of main characteristics configuring content. Thus, according to an embodiment of the present disclosure, the location where the cut is arranged on the image may be determined for each cut by comparing the cuts of the pre-processed content and the cuts of the original content.

In addition, the matchable content generating unit 330 generates empty images having same sizes as the images of the original content and arranges cuts of pre-processed images on the generated empty images based on determined locations of cuts. Here, a cut lost in the damaged content may be remained as the empty image.

FIG. 10A and FIG. 10B illustrate an example of adjusting the location of a cut, according to an embodiment of the present disclosure.

Referring to FIG. 10A and FIG. 10B, the cuts 9b1, 9b3, and 9b4 of the pre-processed content of the damaged content shown in FIG. 9B having adjusted sizes are illustrated. Also, the images 6a1 through 6a4 of the original content are illustrated. The first image 6a1 of the original content includes a cut leaned to the upper left. Reflecting this, according to an embodiment of the present disclosure, an accurate location of the first cut 9b1 may be determined such that a cut is leaned to the left of an image by comparing the first cut 9b1 of the pre-processed content and a cut of the first image 6a1 of the original content.

Also, images 10b1 through 10b4 of the matchable content are generated by generating empty image areas identical to the images 6a1 through 6a4 of the original content and arranging cuts based on determined locations of the cuts 9b1, 9b3, and 9b4 on the empty images. As shown in FIG. 10A and FIG. 10B, a second image 10b2 may be an empty image because there is no cut of the damaged content corresponding to the second image 10b2. Also, referring to a first image 10b1, even when a middle portion of a cut is split like the first cut 9b1, a conjoined cut may be generated like the first image 6a1 of the original content via location adjustment. Also, referring to a fourth image 10b4, a fourth cut 9b4 may be arranged on the empty image such that a portion of the fourth cut 9b4, which is overlapped and lost, is reflected. As such, matchable content having adjusted sizes and locations of cuts may be generated.

Next, the matching unit 340 matches the original content and the matchable content for each cut (operation S4). The matching of the original content and the content for matching denotes that the original content and the content for matching are compared for each cut to determine whether there is a different portion (operation S4). Also, the matching unit 340 may match the original content and the matchable content for each cut, differently display same portions and different portions of the original content and the matchable content, and provide the same to the user terminal 110. According to a selective embodiment, the matching unit 340 may display a portion where the original content and the matchable content are the same in a first color and display a portion where the original content and the matchable content are different in a second color. For example, the portion where the original content and the matchable content are the same may be displayed in gray and the portion where the original content and the matchable content are different may be displayed in black to be provided to a user.

Figure 11:
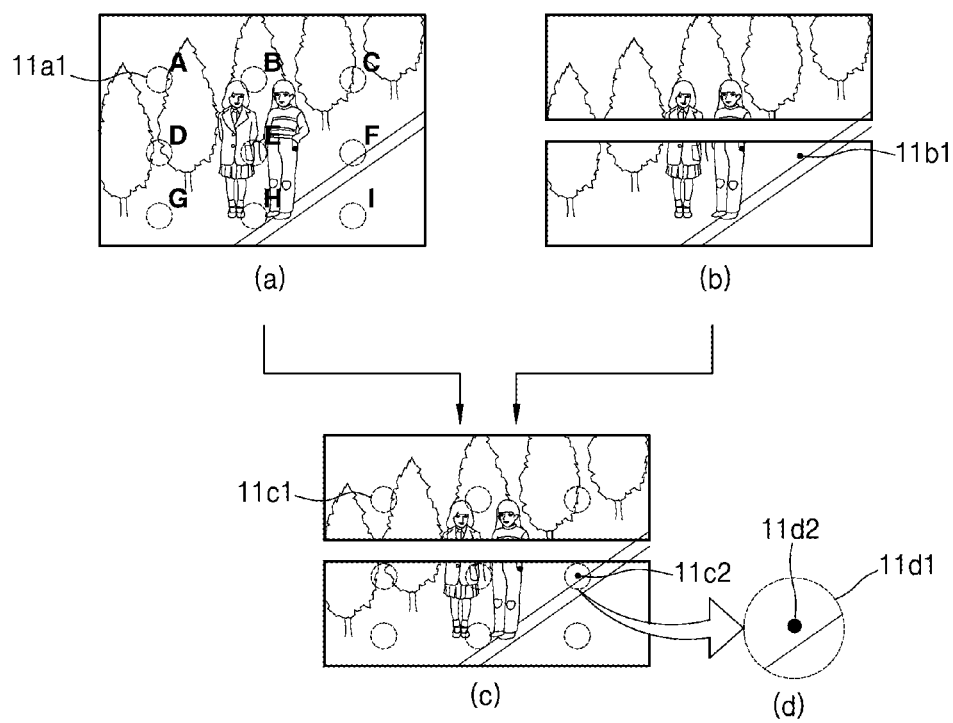
FIG. 11 are example diagrams illustrating comparing of original content with matchable content, according to an embodiment of the present disclosure.

FIG. 11 illustrates an example of matching original content and matchable content, according to an embodiment of the present disclosure.

Referring to FIG. 11, (a) is an example of the original content and (b) is an example of the matchable content. In (a), that is the original content, a location to which a mark for displaying a character string capable of indicating leaker information is added may be assigned. For example, as shown in (a) of FIG. 11, a region 11a1 corresponds to an alphabet A, and other regions may also correspond to alphabets B through I. Although only regions corresponding to the alphabets A through I are shown for convenience of description, regions corresponding to all alphabets and numbers may be assigned in one cut. The assigned region is stored in a separate management system and is not shown in an original image. The locations of the regions are determined by the system at designated positions or determined at arbitrary positions.

Also, (b), that is the matchable content, has adjusted size and location of the damaged content generated based on the marked content of the original content, and thus a mark 11b1 may be added thereto. According to an embodiment of the present disclosure, the original content and the matchable content are matched for each cut to detect a mark that is present in the matchable content but not present in the original content. In this regard, content in which the original content and the matchable content are matched may be generated as shown in (c) of FIG. 11. According to a selective embodiment of the present disclosure, when providing the matched content of (c) of FIG. 11 to the user, a portion of the content where the original content and the matchable content are the same may be displayed in gray or may not be displayed, and a portion where the original content and the matchable content are not the same may be displayed in white or black, such that the different portion is easily detectable.

Next, the mark detecting unit 350 detects a mark present in a specific cut of the matchable content but not present in a specific cut of the original content, for each cut of the original content and matchable content (operation S5). The mark is present only in the specific cut of the matchable content and not present in the corresponding specific cut of the original content because the matchable content is based on the marked content obtained by adding a mark for leaker detection to the original content. Accordingly, leaker information may be obtained by detecting the mark and referring to a location where the mark is added.

Then, referring to the example of FIG. 11, the mark 11b1 displayed on the matchable content of (b) may indicate the leaker information. For example, when the original content and the matchable content are matched as shown in (c) of FIG. 11, there is no mark in a region corresponding to 11c1, but there is a mark in a region corresponding to 11c2 of the original content, and thus the matchable content may indicate leaker information corresponding to the alphabet F. The region corresponding to 11c2 of the original content is illustrated in (d) of FIG. 11. The diagram in (d) of FIG. 11 shows that 11d1 corresponds to the region corresponding to 11c2, and confirms that the mark 11d2 exists in the region corresponding to 11d1.

Figure 12:
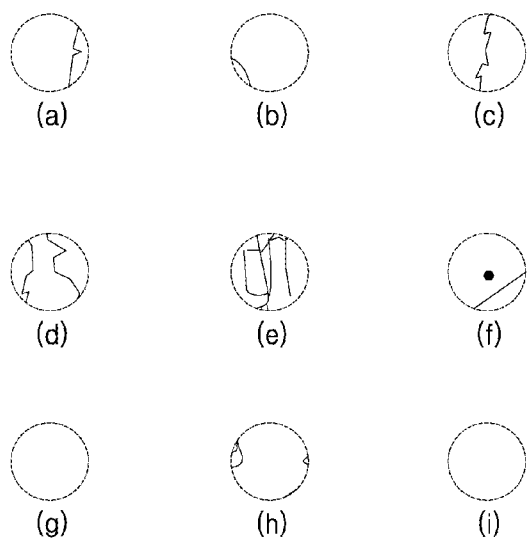
FIG. 12 are example diagrams illustrating detecting of a mark, according to an embodiment of the present disclosure.

FIG. 12 illustrates an example of detecting a mark, according to an embodiment of the present disclosure.

(a) through (i) of FIG. 12 are examples of enlarged regions corresponding to alphabets A through I after matching a specific cut of the original content and a specific cut of the matchable content, according to an embodiment of the present disclosure. In other words, according to an embodiment of the present disclosure, corresponding leaker information may be determined after detecting the mark by enlarging and analyzing a location where the mark is added. According to another embodiment of the present disclosure, the regions corresponding to the alphabets A through I may be enlarged according to an operation of a user and then provided to the user as in FIG. 12. The user may look at images of (a) through (i) of FIG. 12, find a dot in (f), and determine that information of a leaker corresponding to the cut is the alphabet F.

The embodiments according to the present disclosure described above may be implemented in a form of a computer program executable by various components on a computer, and such a computer program may be recorded in a computer-readable medium. Here, the medium may continuously store computer-executable programs, or store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

Hereinabove, the present disclosure has been described by specific matters such as specific elements and limited embodiments and drawings, but these are provided only to help more general understanding of the present disclosure. The present disclosure is not limited to the above embodiments and anyone with ordinary knowledge in the technical field to which the present disclosure belongs may make various modifications and changes from these descriptions.

Therefore, the spirit of the present disclosure should not be determined limitedly based on the above-described embodiments, and not only the appended claims but also all ranges equivalent to or equivalently changed from the claims are within the scope of the spirit of the present disclosure.

The invention claimed is:

1. An apparatus for detecting marks in damaged content by using image matching, the apparatus comprising:
   a processor configured to generate marked content by adding a mark to each cut of original content, the original content including a plurality of cuts that are separated from each other by a space, wherein a location of the mark added to each cut of the original content corresponds to a character of a character string indicating viewer information;
   a damaged content obtaining unit configured to obtain the damaged content generated based on the marked content;
   a pre-processed content generating unit configured to merge a plurality of images included in the damaged content to generate a combined image in which the plurality of images are connected to each other in a non-overlapping manner;
   a matchable content generating unit configured to adjust sizes and/or locations of one or more cuts included in the combined image by comparing the plurality of cuts included in the original content and the one or more cuts included in the combined image to generate matchable content;
   a matching unit configured to match the original content with the matchable content, for each cut; and
   a mark detecting unit configured to detect a location of a mark present in each cut of the matchable content, but not present in a corresponding cut of the original content by comparing the matchable content with the original content, for each cut, and determine information about a leaker based on the locations of the marks on the matchable content.

2. The apparatus of claim 1, wherein the matching unit is configured to determine a first portion of the matchable content that is the same as the original content and a second portion of the matchable content that is different from the original content, and display the first portion of the matchable content in a first color and the second portion of the matchable content in a second color.

3. The apparatus of claim 1, wherein the matchable content generating unit is further configured to:
   determine a cut location of each of the one or more cuts included in the combined image by comparing the plurality of cuts included in the original content and the one or more cuts included in the combined image;
   generate one or more empty images of a same size as a plurality of images of the original content, the plurality of images each including at least one of the plurality of cuts included in the original content; and
   arrange the one or more cuts included in the combined image on the one or more empty images, based on the determined cut location.

4. The apparatus of claim 1, wherein the matchable content generating unit is further configured to calculate a scale ratio for each of the cuts by comparing the plurality of cuts of the original content and the one or more cuts of the combined image, and then adjust the sizes of the one or more cuts of the combined image based on the calculated scale ratio.

5. The apparatus of claim 1, wherein the pre-processed content generating unit is further configured to generate the combined image including only the one or more cuts obtained by removing outer regions of the one or more cuts of the plurality of images.

6. The apparatus of claim 1, wherein the matchable content generating unit is further configured to calculate a scale ratio based on a horizontal length of a cut when the original content is vertical content where the plurality of cuts is arranged in vertical direction and calculate the scale ratio based on a vertical length of the cut when the original content is horizontal content where the plurality of cuts is arranged in horizontal direction.

7. The apparatus of claim 1, wherein the matchable content generating unit is further configured to calculate a scale ratio of a second cut of the combined image, and adjust sizes of other cuts of the combined image, based on the calculated scale ratio of the second cut of the combined image.

8. The apparatus of claim 1, wherein the mark detecting unit is further configured to enlarge and display regions in the matchable content where the mark is addable.

9. The apparatus of claim 1, wherein the pre-processed content generating unit is further configured to generate the combined image by removing a partial region of one or more cuts included in the damaged content.

10. A method of detecting marks in damaged content by using image matching, the method comprising:
generating marked content by adding a mark to each cut of original content, the original content including a plurality of cuts that are separated from each other by a space, wherein a location of the mark added to each cut of the original content corresponds to a character of a character string indicating viewer information;
obtaining the damaged content generated based on the marked content;
merging a plurality of images included in the damaged content to generate a combined image in which the plurality of images which are connected to each other in a non-overlapping manner;
adjusting sizes and/or locations of one or more cuts included in the combined image by comparing the plurality of cuts included in the original content and the one or more cuts included in the combined image to generate matchable content;
matching the original content and the matchable content, for each cut;
detecting a location of a mark present in each cut of the matchable content but not present in a corresponding cut of the original content by comparing the matchable content with the original content, for each cut; and
determining information about a leaker based on the locations of the marks on the matchable content.

11. The method of claim 10, wherein the generating of the matchable content comprises:
determining a cut location of each of the one or more cuts included in the combined image by comparing the plurality of cuts included in the original content and the one or more cuts included in the combined image;
generating one or more empty images of a same size as a plurality of images of the original content, the plurality of images each including at least one of the plurality of cuts included in the original content; and
arranging the one or more cuts included in the combined image on the one or more empty images, based on the determined cut location.

12. The method of claim 10, wherein the generating of the pre-processed content comprises:
generating the combined image including only the one or more cuts obtained by removing outer regions of the one or more cuts of the plurality of images.

13. The method of claim 10, wherein the generating of the matchable content comprises:
calculating a scale ratio for each cut by comparing the plurality of cuts of the original content and the one or more cuts of the combined image, and then adjusting the sizes of the one or more cuts of the combined image based on the calculated scale ratio.

14. The method of claim 10, further comprising:
generating the combined image by removing a partial region of one or more cuts included in the damaged content.

* * * * *